United States Patent
Chaluvaiah et al.

(10) Patent No.: US 10,572,151 B2
(45) Date of Patent: Feb. 25, 2020

(54) SYSTEM AND METHOD TO ALLOCATE AVAILABLE HIGH BANDWIDTH MEMORY TO UEFI POOL SERVICES

(71) Applicant: DELL PRODUCTS, LP, Round Rock, TX (US)

(72) Inventors: Swamy Kadaba Chaluvaiah, Austin, TX (US); David K. Chalfant, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 205 days.

(21) Appl. No.: 15/645,702

(22) Filed: Jul. 10, 2017

(65) Prior Publication Data
US 2019/0012088 A1 Jan. 10, 2019

(51) Int. Cl.
*G06F 3/06* (2006.01)
*G06F 9/4401* (2018.01)

(52) U.S. Cl.
CPC .......... *G06F 3/0607* (2013.01); *G06F 3/0608* (2013.01); *G06F 3/0631* (2013.01); *G06F 3/0685* (2013.01); *G06F 9/4401* (2013.01); *G06F 9/4406* (2013.01); *G06F 9/4411* (2013.01)

(58) Field of Classification Search
CPC .... G06F 3/0607; G06F 3/0608; G06F 3/0631; G06F 3/0685; G06F 9/4401; G06F 9/4406; G06F 9/4411
See application file for complete search history.

(56) References Cited

U.S. PATENT DOCUMENTS

| | | | |
|---|---|---|---|
| 7,752,427 B2 | 7/2010 | Lambrache et al. | |
| 9,507,581 B2 | 11/2016 | Butcher et al. | |
| 2003/0023812 A1 | 1/2003 | Nalawadi et al. | |
| 2004/0133790 A1 | 7/2004 | Hensley | |
| 2004/0153733 A1 | 8/2004 | Lin | |
| 2006/0123223 A1 | 6/2006 | Mayfield et al. | |
| 2012/0246385 A1 | 9/2012 | Dhandapani et al. | |
| 2013/0111180 A1* | 5/2013 | Wong | G06F 12/0246 711/173 |
| 2014/0025880 A1* | 1/2014 | Yu | G06F 12/0638 711/105 |
| 2014/0365755 A1 | 12/2014 | Liu et al. | |
| 2015/0089238 A1 | 3/2015 | Lewis | |
| 2016/0140039 A1* | 5/2016 | Sodani | G06F 12/0646 711/119 |
| 2017/0270301 A1* | 9/2017 | Vidyadhara | G06F 9/4411 |

* cited by examiner

*Primary Examiner* — Aracelis Ruiz
(74) *Attorney, Agent, or Firm* — Larson Newman, LLP (57) ABSTRACT

An information handling system includes a dynamic random access memory, and a processor. The dynamic random access memory includes a lower memory portion and multi-channel dynamic random access memory portion. The dynamic random access memory is allocated to operations of a boot process of the information handling system. The processor communicates with the dynamic random access memory. The processor determines whether a fast memory allocation service is detected in the boot process. In response to the fast memory allocation being detected, the processor allocates the multi-channel dynamic random access memory portion of the dynamic random access memory to operations of the boot process.

20 Claims, 5 Drawing Sheets

SYSTEM AND METHOD TO ALLOCATE AVAILABLE HIGH BANDWIDTH MEMORY TO UEFI POOL SERVICES

FIELD OF THE DISCLOSURE

The present disclosure generally relates to information handling systems, and more particularly relates to allocating available high bandwidth memory to UEFI pool services.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a dynamic random access memory and a processor. The dynamic random access memory includes a lower memory portion and multi-channel dynamic random access memory portion. The dynamic random access memory is allocated to operations of a boot process of the information handling system. The processor communicates with the dynamic random access memory, and determines whether a fast memory allocation service is detected in the boot process. In response to the fast memory allocation being detected, the processor allocates the multi-channel dynamic random access memory portion of the dynamic random access memory to operations of the boot process.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system may include a dynamic random access memory (DRAM) and a processor. The DRAM may include memory, such as synchronous dynamic random access memory (SDRAM), located behind an external data bus, such as a double data rate (DDR) bus. The DRAM may optionally include additional high bandwidth, multi-channel dynamic random access memory (MCDRAM) located internally on the processor package itself. The processor can communicate with the DRAM, and can determine whether optional, high-bandwidth, on-package, MCDRAM is detected. In addition, the processor determines if a fast memory allocation service is supported during the boot process. If both a fast memory allocation service and high-bandwidth, on-package memory are detected, the processor can then allocate the high-bandwidth, on-package, MCDRAM portion of the overall SDRAM to operations of the boot process using the fast memory allocation service as described in FIGS. 1-4 below.

Figure 1:
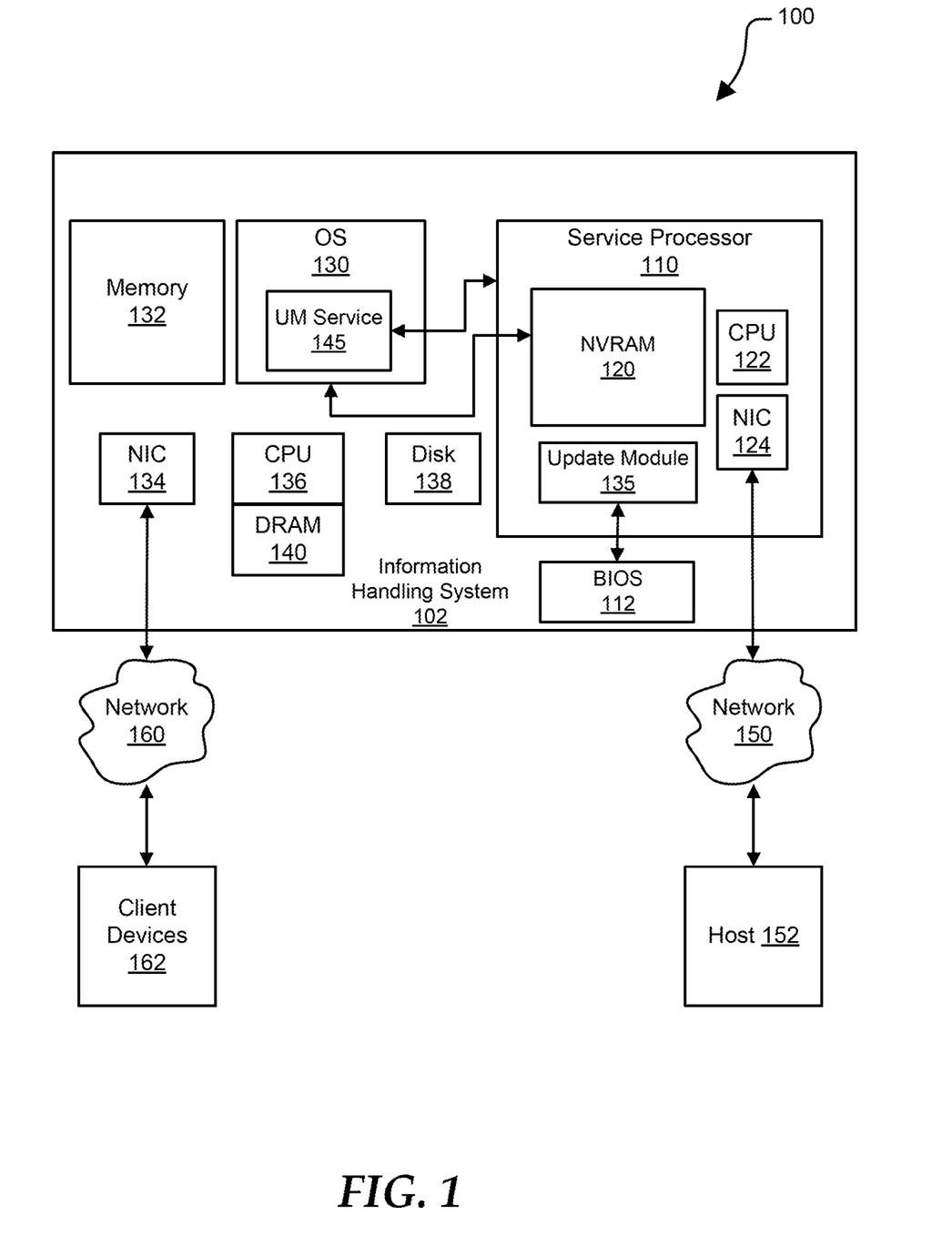
FIG. 1 is block diagram of a system that includes multiple storage devices to store copies of an operating system boot image according to at least one embodiment of the disclosure.

FIG. 1 shows a system 100 including an information handling system 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The information handling system 102, host 152, and client devices 162. In an embodiment, the information handling system 102 can be a server. The information handling system 102 includes a service processor 110, a basic input/output system (BIOS) 112, operating system (OS) 130, a memory 132, a network interface card (MC) 134, a central processing unit (CPU) 136, a disk 138, and a dynamic random access memory (DRAM) 140. In an embodiment, the DRAM 140 can be an on-chip memory for the CPU 136. In an embodiment, the DRAM 140 can include a multi-channel DRAM (MCDRAM) portion, as shown in FIG. 2.

Figure 2:
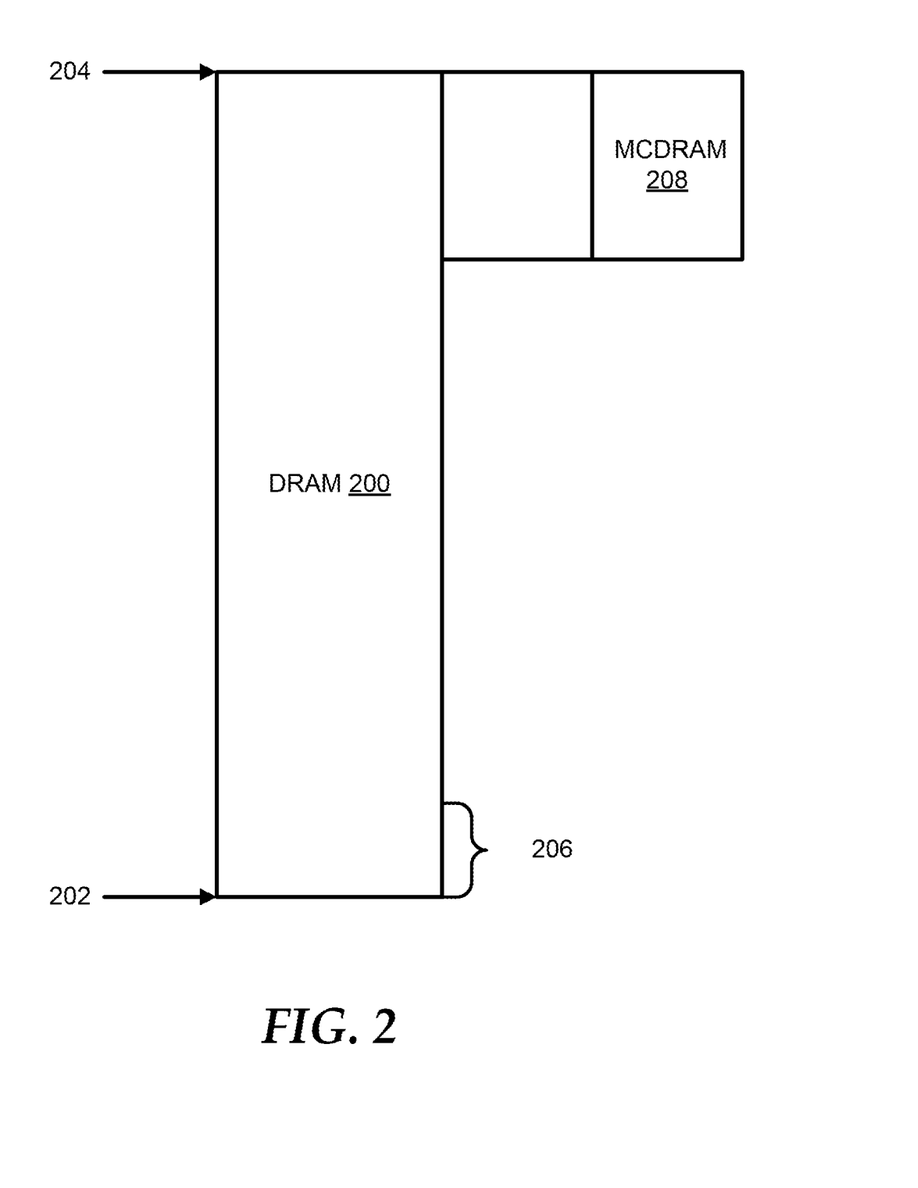
FIG. 2 is a block diagram of a dynamic random access memory of the information handling system according to at least one embodiment of the present disclosure.

FIG. 2 illustrates a DRAM 200 according to at least one embodiment of the present disclosure. The DRAM 200 includes a lowest memory location 202, a top memory location 204, a lowest memory portion 206, and a MCDRAM portion 208. In an embodiment, the DRAM 200 can be the DRAM 140 of FIG. 1. In an embodiment, the lower portion 206 of DRAM 200 can be a slower memory portion of DRAM 200 as compared to the MCDRAM portion 208. In an embodiment, the MCDRAM portion 208 can be a high bandwidth, stacked-die, technology used for processor on-package memory. In this situation, operations utilizing the MCDRAM portion 208 can be performed five times faster than the lower portion 206. The DRAM 140 can be utilized by the CPU 136 while the OS 130 is being executed and while a boot process of the information handling system 102 is being performed, as will be discussed with respect to FIG. 3 below.

Referring back to FIG. 1, the service processor 110 includes a non-volatile random access memory (NVRAM) 120, a CPU 122, a NIC 124, and an update module 135. For purposes of this application, the term NVRAM refers to all non-volatile memory technologies. The service processor 110 represents an integrated device or devices that is utilized to provide out-of-band management functions to the information handling system 102 that includes management system, and can include a chassis management controller (CMC), a baseboard management controller (BMC), a management engine (ME), an integral part of a Dell remote access controller (DRAC), or an integrated Dell remote access controller (iDRAC), which are systems management hardware and software solutions operable to provide remote management capabilities and that operate according to the an Intelligent Platform Management Interface (IPMI) specification, such as an IPMI Specification V2.0.

The service processor 110 of the information handling system 102 is connected to the host 152 through network 150, and to other the client devices 162 through the network 160. In some embodiments, the network 150 may comprise an out-of-band management network and the network 160 may comprise a client, OS, or in-band network. Other client devices 162 may be a client device communicating with information handling system 102 or may be another server of the system 100 that operates information handling system 102.

The service processor 110 may be any system, device, apparatus or component of information handling system 102 configured to permit an administrator or other person to remotely monitor and/or remotely manage information handling system 102 (for example, by an information handling system remotely connected to information handling system 102 via the network 150) regardless of whether information handling system 102 is powered on and/or has an operating system installed thereon. In certain embodiments, the service processor 110 may allow for out-of-band control of information handling system 102. Out-of-band communications refer to communications that may bypass an operating system, such as OS 130. The communications may utilize hardware resources and components that are independent of an operating system. In the embodiment of FIG. 1, network communications to and from the service processor 110 are sent through the NIC 124 that is physically isolated from the in band communication through network interface card 134. The NIC 124 may serve as an interface between the service processor 110 and the network 150. The NIC 124 may enable the service processor 110 to communicate over the network 150 using any suitable transmission protocol and/or standard.

In some embodiments, an administrator may be able to diagnose problems that have caused failure of information handling system 102. In the same or alternative embodiments, the service processor 110 may allow an administrator to remotely manage one or more parameters associated with operation of information handling system 102 such as power usage, processor allocation, memory allocation, or security privileges.

CPU 122 may be communicatively coupled to NVRAM 120, the NIC 124, and update module 135. CPU 122 may also be electrically coupled to a power source dedicated to the service processor 110. CPU 122 may include any system, device, or apparatus configured to interpret and/or execute program instructions and/or process data, and may include, without limitation a microprocessor, microcontroller, or any other digital or analog circuitry configured to interpret and/or execute program instructions and/or process data. In some embodiments, CPU 122 may interpret and/or execute program instructions and/or process data stored in NVRAM 120, update module 135, and/or another component of the service processor 110.

Update module 135 may obtain code for use on information handling system 102. For purposes of this disclosure, code includes software, firmware, and other forms of computer programs. Update module 135 may make the code available to information handling system 102. The code may be updates of previously installed code or may be for initial installation. Some of the code may be downloaded from the host 152 over the network 150. Update module 135 may constitute an advanced embedded system management tool for automated updates of system code, code inventory, code rollback (restoration of code to a previous version), and code correction. Update module 135 may reside in non-volatile memory, such as in NVRAM 120, may be started during a boot sequence, and may function in a pre-operating system environment. In some embodiments, the host 152 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

Operating system 130 includes update manager service 145. Update manager service 145 is a service or daemon, a computer program that runs as a background process. Daemons may be started at boot time and may respond to network requests, hardware activity, or other programs by performing some task. Daemons may also configure hardware and run scheduled tasks. Update manager service 145 may be created by an operating system vendor or may be installed during the manufacture of information handling system 102.

In the embodiment of FIG. 1, update manager service 145 communicates with the service processor 110 about code, such as device drivers. A device driver may constitute software that acts as an interface between hardware and operating system 130 or another higher-level program. The device driver may communicate with the hardware over a communications bus. It may receive calls from the higher-level program and issue commands to the hardware in response to the commands.

Update manager service 145 may, for example, constantly scan for deployment of new hardware. If it detects new hardware, it may send a message to the service processor 110 to provide device drivers needed for the new hardware. The messages may be sent under a standard management protocol, such as Intelligent Platform Management Interface (IPMI) or WS-Management (WS-Man). Similarly, update manager service 145 may receive messages from the service processor 110 of the availability of code for use by operating system 130, such as the availability of device drivers for newly-installed hardware or updated device drivers and may inform operating system 130.

During a Unified Extensible Firmware Interface (UEFI) boot process, a boot image can be loaded from BIOS 112 and the boot process can be executed by the CPU 136. In an embodiment, the CPU 136, through different boot services in boot process, the CPU 136 may be allocated different portions of the DRAM 140 to operations of the boot process as will be discussed with respect to FIG. 3 below.

Figure 3:
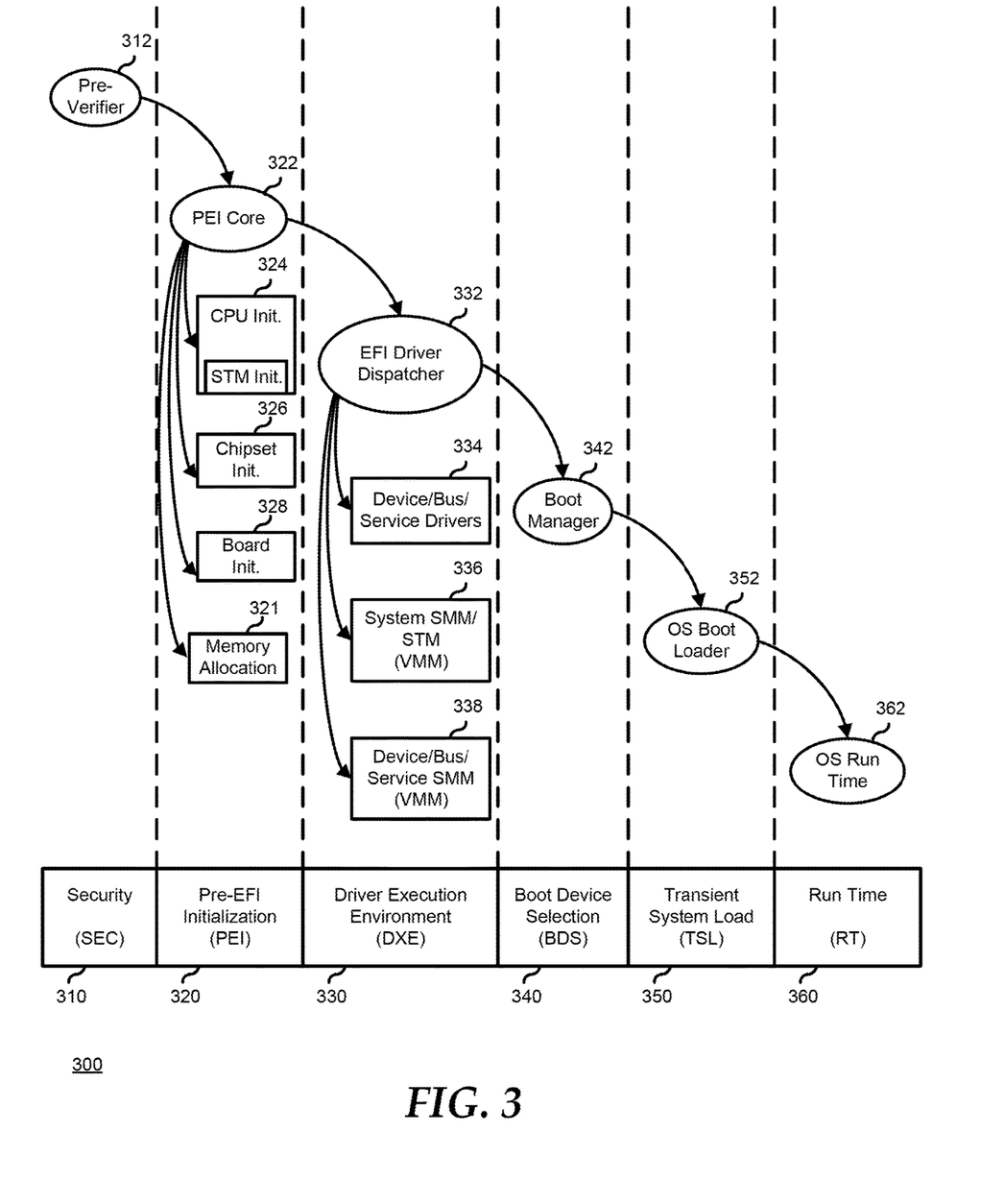
FIG. 3 is a boot phase diagram for the information handling system according to at least one embodiment of the present disclosure.

FIG. 3 illustrates a boot phase diagram 300 for an information handling system that operates using a UEFI, including a security phase (SEC) 310, a pre-EFI initialization phase (PEI) 320, a driver execution environment phase (DXE) 330, a boot device selection phase (BDS) 340, a transient system load phase (TSL) 350, and a run time phase (RT) 360. SEC 310 is the first phase of a UEFI boot process on the information handling system 102 that operates to set up a pre-verifier 312. Pre-verifier 312 handles all restart events on the information handling system 102, and temporarily allocates a portion of memory for use during the other boot phases.

SEC 310 is executed out of the firmware resident on the information handling system 102, and so serves as a root of trust for the system. The SEC phase 310 can find, validate, and run the PEI phase 320. The SEC phase also can initialize any trusted platform management (TPM) modules within the information handling system 102, can initialize and run a built-in self test (BIST) for the CPU, such as CPU 136, and can initialize a cache memory or memories associated with the CPU 136.

SEC 310 can then pass execution to PEI 320 which initializes the system memory for the information handling system 102 during memory allocation 321. PEI 320 also includes CPU initialization 324, chipset initialization 326, and board resource initialization 328. During memory allocation 321, the CPU, such as CPU 136, can determine whether a fast memory allocation service is detected in the boot process. In an embodiment, the fast memory allocation service can be a UEFI service, such as AllocateFastMem, which can cause the CPU to utilize a high bandwidth memory for memory allocation services. In an embodiment, the high bandwidth memory can be MCDRAM portion 208 of the DRAM 200 or 140. If the CPU does not detect the fast memory allocation service, the CPU can allocate a lower portion, such lower portion 206 of DRAM 200, to later operations of the boot process. In this situation, the CPU can allocate the MCDRAM portion of the DRAM to the operating system, such as OS 130, and the PEI 320 can pass the execution to DXE 330.

However, if the CPU does detect the fast memory allocation service during memory allocation 321, the CPU can allocate the MCDRAM portion of the DRAM to later operations of the boot process, such as DXE 330, BDS 340, and TSL 350. Also, during memory allocation 321, the CPU can allocate MCDRAM portion of the DRAM to an operating system, such as OS 130 of the information handling system 102, after the boot process has been completed. Thus, in this situation, the memory allocation service 321 can allocate the MCDRAM portion to boot operations during the boot process, then when the boot process is completed the MCDRAM portion of the DRAM can be allocated to the operating system of the information handling system for run time operations. In this embodiment, the boot processes of DXE 330, BDS 340, and TSL 350 can be executed five times faster when the MCDRAM portion of the DRAM is allocated to the boot process operations as compared to when a lower portion of the DRAM is allocated to the later boot operations.

PEI 320 can then pass execution to DXE 330 which performs device specific initializations for the information handling system. In particular, DXE 330 executes an EFI driver dispatcher 332 that operates to load device, bus, and service drivers 334, to instantiate the system SMI handler in the STM 336, and to instantiate virtual machines associated with the device, bus, and service SMMs 338. DXE 330 passes execution to BDS 340 executes a boot manager 342 which identifies a boot target, and passes execution to TSL 350. TSL 350 launches an OS boot loader 352 which loads the operating system, and passes execution to the operating system at RT 360.

Techniques implemented during PEI 320 that utilize services provided by the UEFI specification, such as boot services, and UEFI applications, including OS loaders, must use boot services functions to access devices and allocate memory. Services are defined by interface functions that may be used by code running in the UEFI environment. Such code may include protocols that manage device access or extend platform capability, as well as applications running in the preboot environment, and OS loaders. During boot, system resources are owned by the firmware and are controlled through boot services interface functions. All boot services functionality is available until an OS loader loads enough of its own environment to take control of the system's continued operation and then terminates boot services with a call to ExitBootServices( ).

One class of boot services includes protocol handler services, such as LoadImage, StartImage, InstallProtocolInterface, RegisterProtocolNotify, LocateProtocol, AllocateMem, AllocateFastMem, and numerous others. AllocateFastMem is the protocol handler service disclosed herein. A protocol consists of a 128-bit globally unique identifier (GUID) and a Protocol Interface structure. The structure contains the functions and instance data that are used to access a device. The functions that make up Protocol Handler Services allow applications to install a protocol on a handle, identify the handles that support a given protocol, determine whether a handle supports a given protocol, and the like. LoadImage loads an image, such as a device driver, into system memory, such as memory 140. StartImage transfers control to a loaded image's entry point. InstallProtocolInterface installs a protocol interface on a device handle. A driver can install multiple protocols. RegisterProtocolNotify registers an event that is to be signaled whenever an interface is installed for a specified protocol. LocateProtocol returns an array of handles that support a specified protocol. During DXE 330, boot services and runtime services can be started and a UEFI boot manager can load UEFI drivers and UEFI applications in an order defined by the global NVRAM variables. Driver initialization includes identifying a driver image that is stored on some type of media.

Figure 4:
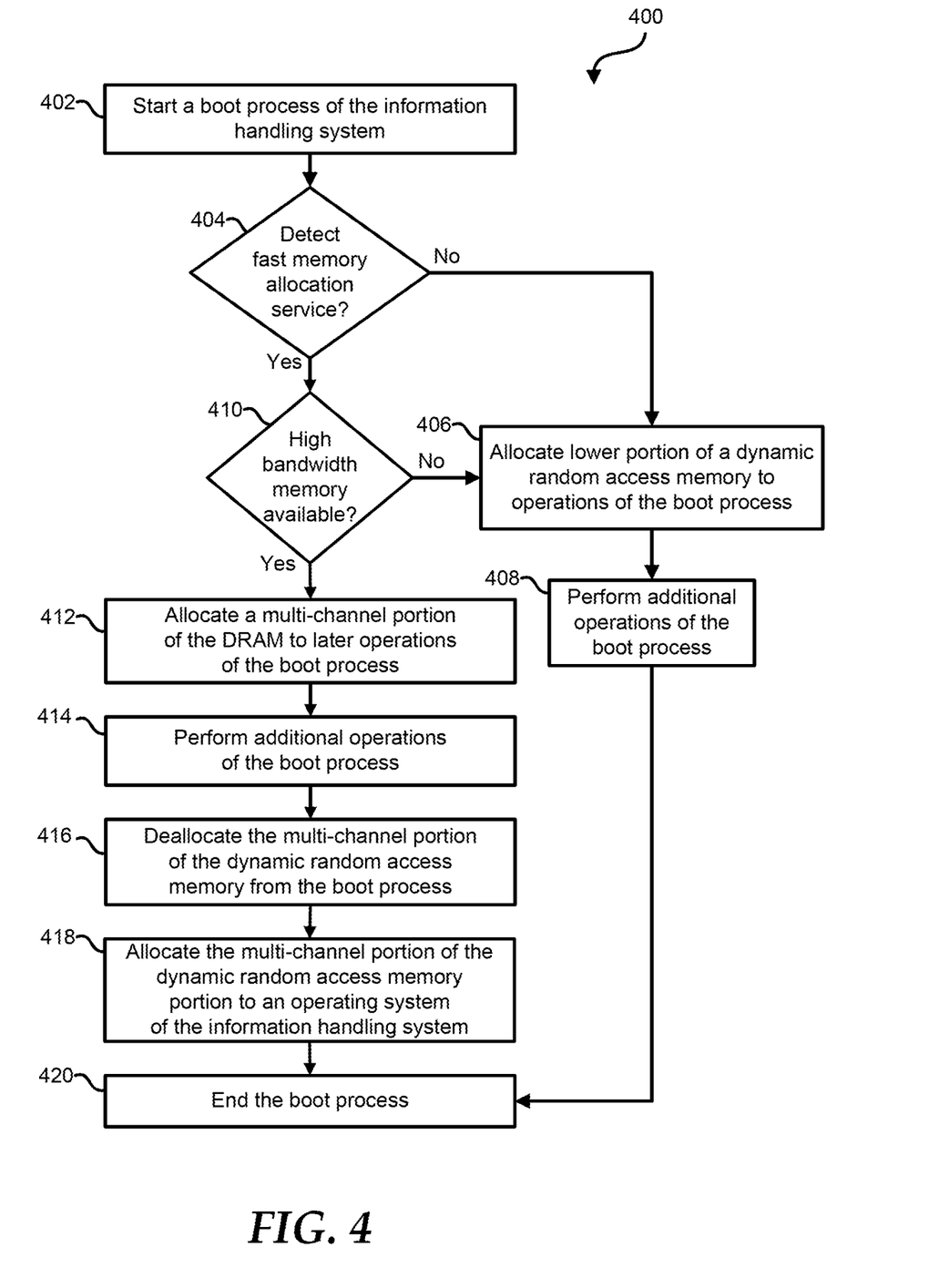
FIG. 4 is a flow diagram of a method for allocating available high bandwidth memory to UEFI pool services according to at least one embodiment of the present disclosure.

FIG. 4 illustrates a method 400 for allocating available high bandwidth memory to UEFI pool services according to at least one embodiment of the present disclosure. At block 402, a boot process, such as a UEFI boot process, of an information handling system is started. At block 404, a determination is made whether a fast memory allocation service is detected. In an embodiment, the fast memory allocation service can be a UEFI service, such as AllocateFastMem, which can cause the boot process to utilize a high bandwidth memory for memory allocation services. In an embodiment, the high bandwidth memory can be a multichannel dynamic random access memory (MCDRAM), and the MCDRAM can be an on-chip memory of the processor executing the UEFI boot process. If the fast memory allocation service is not detected, a lower portion of a DRAM is allocated to operations of the boot process during UEFI memory allocation at block 406, and additional operations of the boot process are performed at block 408.

If the fast memory allocation service is detected, a MCDRAM portion of a DRAM is allocated to later operations of the boot process at block 412. In an embodiment, the MCDRAM portion of the DRAM can be a top portion the DRAM. For example, the MCDRAM can be the top 16 Gb of the DRAM. At block 414, additional operations of the boot process are performed. The MCDRAM portion of the DRAM is deallocated from the operations of the boot process at block 416. At block 420, the MCDRAM portion of the DRAM is allocated to an operating system of the information handling system. The boot process ends at block 420.

Figure 5:
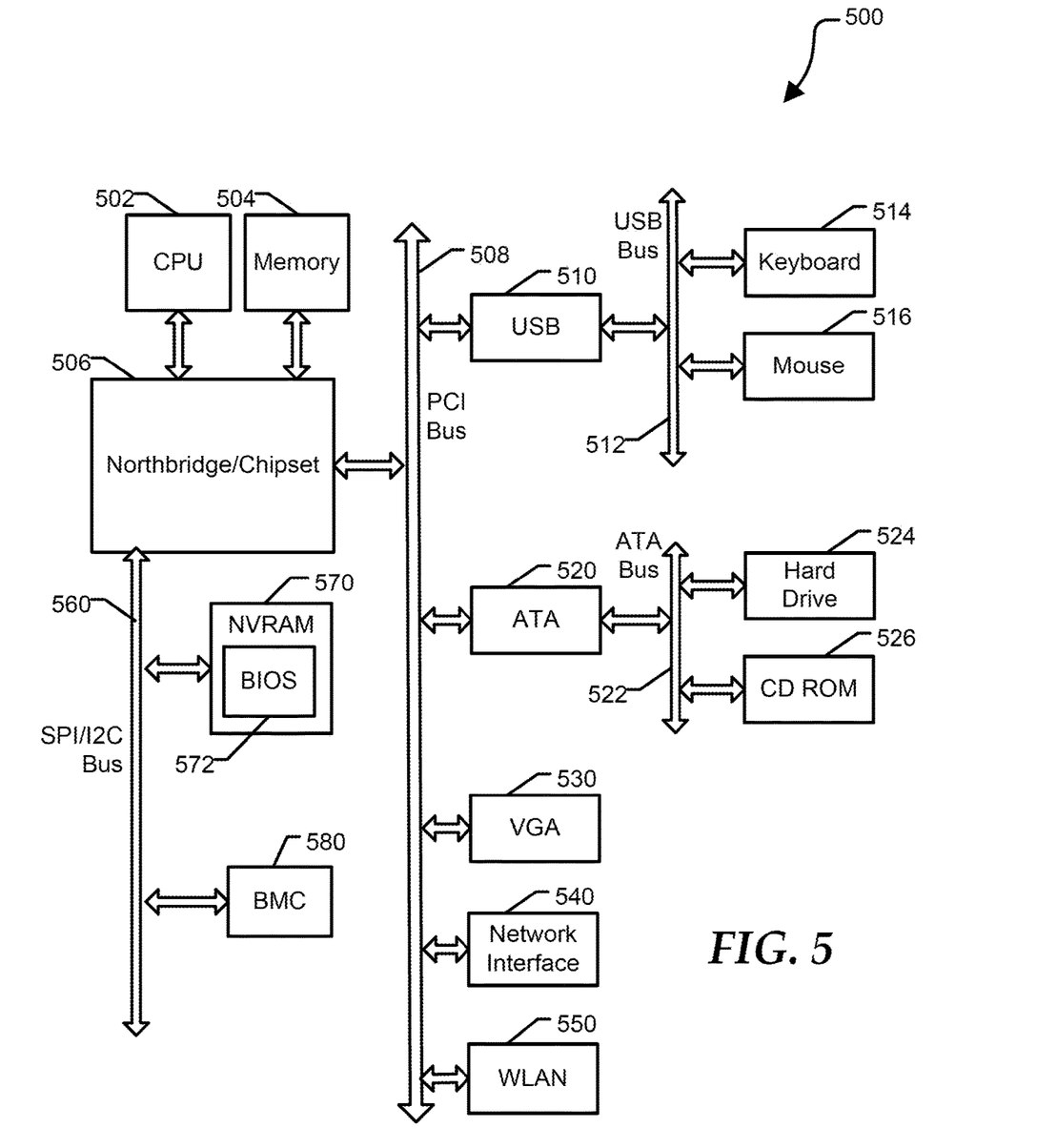
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a dynamic random access memory allocated to operations of a boot process of the information handling system, wherein the dynamic random access memory includes a lower memory portion and multi-channel dynamic random access memory portion; and
   a processor to communicate with the dynamic random access memory, the processor to determine whether a fast memory allocation service is detected in the boot process, and in response to the fast memory allocation being detected to allocate the multi-channel dynamic random access memory portion of the dynamic random access memory to operations of the boot process.

2. The information handling system of claim 1, in response to the fast memory allocation not being detected, the processor further to allocate the lower memory portion of the dynamic random access memory to the operations of the boot process, and to execute the operations of the boot process from the lowest portion of the dynamic random access memory.

3. The information handling system of claim 1, wherein the multi-channel dynamic random access memory portion is an on-chip memory of the processor executing the boot process.

4. The information handling system of claim 1, wherein the multi-channel dynamic random access memory portion is a high bandwidth memory.

5. The information handling system of claim 1, wherein the fast memory allocation service is an Unified Extensible Firmware Interface service of the boot process.

6. The information handling system of claim 1, the processor further to execute the operations of the boot process from the multi-channel dynamic random access memory portion of the dynamic random access memory.

7. The information handling system of claim 1, the multi-channel dynamic random access memory portion is a top portion of the dynamic random access memory.

8. A method comprising:
   starting, by a processor, a boot process of an information handling system;
   determining whether a fast memory allocation service is detected in the boot process; and
   if the fast memory allocation is detected, then allocating, by the processor, a multi-channel dynamic random access memory portion of a dynamic random access memory to operations of the boot process.

9. The method of claim 8 further comprising:
   if the fast memory allocation is not detected, allocating a lowest portion of the dynamic random access memory to the operations of the boot process; and
   executing the operations of the boot process from the lowest portion of the dynamic random access memory.

10. The method of claim 8 wherein the multi-channel dynamic random access memory portion is an on-chip memory of the processor executing the boot process.

11. The method of claim 8 further comprising:
    executing the operations of the boot process from the multi-channel dynamic random access memory portion of the dynamic random access memory.

12. The method of claim 8 wherein the multi-channel dynamic random access memory portion is a top portion of the dynamic random access memory.

13. The method of claim 8 wherein the multi-channel dynamic random access memory portion is a high bandwidth memory.

14. The method of claim 8 wherein the fast memory allocation service is an Unified Extensible Firmware Interface service of the boot process.

15. A method comprising:
    starting, by a processor, a boot process of an information handling system;
    determining whether a fast memory allocation service is detected in the boot process; and
    if the fast memory allocation is detected, then allocating, by the processor, a multi-channel dynamic random access memory portion of a dynamic random access memory to operations of the boot process;
    if the fast memory allocation is not detected, then allocating a lowest portion of the dynamic random access memory to the operations of the boot process.

16. The method of claim 15 wherein the multi-channel dynamic random access memory portion is a top portion of the dynamic random access memory.

17. The method of claim 15 wherein the multi-channel dynamic random access memory portion is an on-chip memory of the processor executing the boot process.

18. The method of claim 15 further comprising:
    executing the operations of the boot process from the multi-channel dynamic random access memory portion of the dynamic random access memory.

19. The method of claim 15 wherein the multi-channel dynamic random access memory portion is a high bandwidth memory.

20. The method of claim 15 wherein the fast memory allocation service is a Unified Extensible Firmware Interface service of the boot process.

* * * * *